United States Patent [19]

Sakai et al.

[11] Patent Number: 5,480,741
[45] Date of Patent: Jan. 2, 1996

[54] CELL PROVIDED WITH GASEOUS DIFFUSION ELECTRODE, AND METHOD OF CHARGING AND DISCHARGING THE SAME

[75] Inventors: Tetsuo Sakai, Ikeda; Tsutomu Iwaki, Yawata, both of Japan

[73] Assignee: Agency of Industrial Science & Technology, Tokyo, Japan

[21] Appl. No.: 411,975

[22] Filed: Mar. 28, 1995

[30] Foreign Application Priority Data

Apr. 6, 1994 [JP] Japan .................................. 6-093708

[51] Int. Cl.$^6$ .......................... H01M 10/44; H01M 10/52
[52] U.S. Cl. .............................. 429/59; 429/101; 429/223; 320/2
[58] Field of Search ................................ 429/59, 57, 27, 429/101, 223; 320/2

[56] References Cited

U.S. PATENT DOCUMENTS

| | | | |
|---|---|---|---|
| 4,900,642 | 2/1990 | Tomantschger et al. | 429/59 |
| 4,925,747 | 5/1990 | Kordesch et al. | 429/59 |
| 4,957,826 | 9/1990 | Cheiky | 429/27 |
| 5,043,234 | 8/1991 | Tomantschger et al. | 429/59 |

Primary Examiner—Anthony Skapars
Attorney, Agent, or Firm—Nikaido, Marmelstein, Murray & Oram

[57] ABSTRACT

A cell provided with a gaseous diffusion electrode is constituted of the gaseous diffusion electrode, a hydrogen-absorbing alloy electrode, and a chargeable auxiliary electrode wherein nickel hydroxide is used as the active material thereof. The chargeable auxiliary electrode may be disposed either between the gaseous diffusion electrode and the hydrogen-absorbing alloy electrode, or on the opposite side of the gaseous diffusion electrode to the hydrogen-absorbing alloy electrode. The chargeable auxiliary electrode that can be used may be either a sintered-type nickel electrode for securing a long life span, or a foamed-type nickel electrode or a fiber-type nickel electrode for securing a high capacity. The hydrogen-absorbing alloy electrode has a layer of at least one of metallic nickel, cobalt and copper on the surface of the alloy in order to suppress oxidation thereof at the time of over discharge.

13 Claims, 2 Drawing Sheets

CELL PROVIDED WITH GASEOUS DIFFUSION ELECTRODE, AND METHOD OF CHARGING AND DISCHARGING THE SAME

BACKGROUND OF THE INVENTION

The present invention relates to a cell provided with a gaseous diffusion electrode and a method of charging and discharging the same. Secondary cells are widely used in a variety of electric apparatuses and as mobile power sources. Known representative examples of such secondary cells include lead batteries and alkaline batteries.

In such alkaline batteries, a nickel electrode is predominantly used as the positive electrode, but an air electrode or a silver oxide electrode is also used instead in some such batteries. Cadmium, zinc, hydrogen, iron, etc. are usable in negative electrodes, but the use of a cadmium electrode is mainstream. Further, a nickel-hydrogen battery wherein use is made of a hydrogen-absorbing alloy in order to attain a high energy density has been put into practical use.

Meanwhile, investigations have heretofore been made of re-chargeable cells provided with a gaseous diffusion electrode as the positive electrode thereof in order to materialize a high energy density when they are used as mobile power sources, power sources for storage of electric power, etc.

The cells of this type are provided with a chargeable auxiliary electrode in order to prevent the gaseous diffusion electrode from deteriorating because of oxidation thereof during the course of charging. Usually usable examples of the chargeable auxiliary electrode include a nickel screen, and expanded metals from the viewpoint of electrolytic solution resistance, alkali resistance, etc. On the other hand, zinc or the like is usually used as the negative electrodes of the above-mentioned cells, but involves a disadvantage that the life span thereof is short. On the other hand, iron having a comparatively long life span is liable not only to generate hydrogen but also to consume an electrolytic solution because it is poor in charging efficiency. Further, when the side of the negative electrode is involved in a rate-determining step, the capacity of the cell is lowered through charge-discharge thereof. By contrast, since the hydrogen-absorbing alloy is high in charging efficiency, long in life span and little causative of pollution, a cell wherein the hydrogen-absorbing alloy is used as the negative electrode thereof was developed as well. In this kind of cell, wherein oxygen or air is used as the active material of the positive electrode thereof, a high energy density can be accomplished because the active material of the pole exists predominantly inside the cell.

Since air or oxygen on the outside of the cell is inherently used in the above-mentioned cell, however, gaseous diffusion electrodes as the positive electrodes thereof must be installed on both sidewalls of the battery container thereof, with the result that many positive electrodes and negative electrodes cannot be installed in a piled-up state on the inside of the cell unlike other kinds of cells. More specifically, the maximum number of positive electrodes in the cell is 2. Accordingly, the number of negative electrodes as counter electrodes is not required to exceed 2 because no benefit can be secured thereby. When discharging is rapidly carried out, therefore, the current density of the electrodes is increased to notably lower the voltage therebetween. Further, since no active material itself exists in the positive electrodes, oxygen is generated from the beginning of charging in the case of charging to heighten the charging potential, with the result that a high energy power efficiency (Wh efficiency) during the course of either charging or discharging cannot be expected even if the hydrogen-absorbing alloy is used in the negative electrodes.

Accordingly, a primary object of the present invention is to provide a cell capable, of course, of low output discharge like the conventional cells provided with a gaseous diffusion electrode, excellent in high output discharge properties at a high discharge voltage, and capable of exhibiting a high energy efficiency; and a method of charging and discharging the same.

SUMMARY OF THE INVENTION

In view of the foregoing problems of prior art, the inventor of the present invention has made intensive investigations to find out that, when either charging or discharging is carried out according to a given method while using a cell wherein use is made of a specific chargeable auxiliary electrode, either rapid discharge or slow discharge can be effected satisfactorily and a high energy efficiency can further be exhibited during the course of charging or discharging. The present invention has been completed based on this finding.

Specifically, in accordance with the present invention, there is provided a cell provided with a gaseous diffusion electrode: comprising a gaseous diffusion electrode, a hydrogen-absorbing alloy electrode and a chargeable auxiliary electrode wherein nickel hydroxide is used as the active material thereof.

The above-mentioned nickel hydroxide may be used in a state Of being borne on nickel. Configurations of nickel include a sintered nickel substrate which can be turned into an electrode having a long life span, and a foamed nickel substrate and a fibrous nickel substrate which can each be turned into a high-capacity electrode.

The hydrogen-absorbing alloy electrode can be effectively prevented from deteriorating during the course of over discharge when it has at least one of metallic nickel, cobalt and copper borne on the surface thereof.

As for the arrangement of the foregoing gaseous diffusion electrode, hydrogen-absorbing alloy electrode and chargeable auxiliary electrode, gaseous diffusion electrodes may be disposed on both sides of a battery container, and the chargeable auxiliary electrode and the hydrogen-absorbing alloy electrode may be respectively disposed between the gaseous diffusion electrodes according to either of the following embodiments. Specifically, the present invention may be embodied either according to an embodiment wherein a pair of chargeable auxiliary electrodes are disposed between the gaseous diffusion electrodes present on both sides of the battery container and wherein the hydrogen-absorbing alloy electrode(s) is disposed between the chargeable auxiliary electrodes; or according to an embodiment wherein a pair of hydrogen-absorbing electrodes are disposed between the gaseous diffusion electrodes present on both sides of the battery container and wherein the chargeable auxiliary electrode(s) is disposed between the above-mentioned hydrogen-absorbing electrodes.

These electrodes are isolated from one another with separators in order to prevent a short circuit. A separator(s) comprising a micro-porous film as a constituent is preferably used particularly between the alloy electrode(s) and the chargeable auxiliary electrode(s).

In a cell having the foregoing arrangement, charging is carried out using the chargeable auxiliary electrode(s) as the positive electrode(s) thereof and the hydrogen-absorbing alloy electrode(s) as the negative electrode(s) thereof.

Additionally stated, when oxygen generated during the course of charging is recovered and then used as oxygen to be fed to the gaseous diffusion electrode(s) during the course of discharging, a higher discharge potential than in the case of using air can be secured to attain a higher energy efficiency.

The above-mentioned energy efficiency is defined according to the following formula:

$$\text{energy efficiency} = \frac{\text{discharge current (A)} \times \text{discharge time (h)} \times \text{discharge voltage (V)}}{\text{charging current (A)} \times \text{charging time (h)} \times \text{charging voltage (V)}}$$

The hydrogen-absorbing alloy electrode(s) is used as the negative electrode(s) during the course of discharging the cell having the foregoing arrangement. When slow discharge (discharging at a current density of at most about 100 mA/cm$^2$ as the upper limit thereof) is effected like in the conventional cells provided with a gaseous diffusion electrode, the gaseous diffusion electrode(s) is used as the positive electrode(s). When high output discharge is effected at a high voltage, the chargeable auxiliary electrode(s) is used as the positive electrode(s). Such interchange of the positive electrode(s) can be made by an operation of a switch or the like. In this case, the cell can be turned to a single cell capable of low-output discharge to high-output discharge at a high voltage. On the other hand, when such single cells may be built up in the form of layers in series to be used at a high voltage, the respective voltages of the single cells may each be independently controlled to carry out either charging or discharging.

DETAILED DESCRIPTION OF THE PREFERRED EMBODIMENTS

Figure 1:
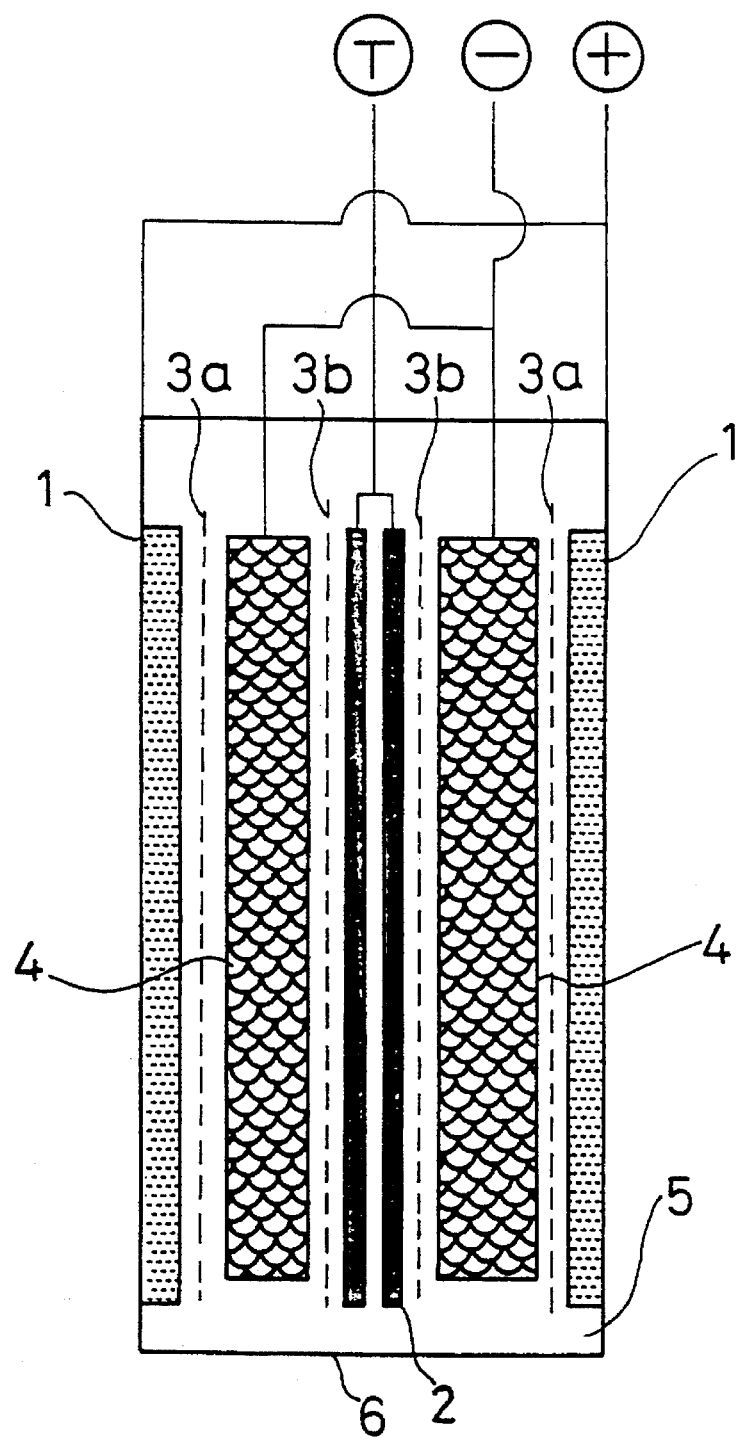
FIG. 1 is a diagram showing an example of the structure of the cell of the present invention.

An example of the cell of the present invention mainly comprises gaseous diffusion electrodes 1, hydrogen-absorbing electrodes 4, chargeable auxiliary electrodes 2, and separators 3a and 3b. In this example, electrodes wherein nickel hydroxide is used as the active material thereof are used particularly as the chargeable auxiliary electrodes.

Air electrodes as are used in a conventional air cell or the like can be used as such as the gaseous diffusion electrodes 1, which may therefore be made of, for example, activated carbon having at least one of platinum, palladium, silver, etc. borne thereon, which may be used either alone or in combination of at least 2 kinds thereof. The amount of such a catalyst to be borne on the activated carbon is usually 1 to 60 wt. %, preferably 1 to 40 wt. %, further preferably 2 to 10 wt. %, based on the activated carbon.

Each of the above-mentioned gaseous diffusion electrodes may alternatively be produced by sintering activated carbon or the like together with a nickel powder, and subsequently making a catalyst such as silver or palladium borne on the resulting sinter. Further, the catalyst-borne activated carbon as mentioned above may be bound with a water-repellent fluororesin or the like to form a reactive layer. Further, a solution-leakage-preventive layer made of a carbon fiber treated with a fluororesin, or the like may appropriately be provided on the side of air.

Usable examples of the hydrogen-absorbing alloy electrodes 2 include a porous substrate of nickel, copper or the like filled with a known variety of hydrogen-absorbing alloy powder, and a molding of the above-mentioned powder produced according to a customary method. For example, an about 100- to 200-mesh powder of the hydrogen-absorbing alloy is formed into a paste using a solution of carboxymethyl-cellulose (CMC), polyvinyl alcohol (PVA) or the like, and a foamed nickel substrate or a substrata formed of fibrous (hereinafter referred to as "fiber-type") nickel is filled with the above-mentioned paste and then pressed to obtain a hydrogen-absorbing alloy electrode. Such foamed-type and fiber-type alloy electrodes have a high capacity of 1.3 to 1.4 Ah/cm$^3$, but are liable to falling-off of the alloy from the substrate and hence liable to lowering of the life span thereof.

Alternatively, the alloy powder may be mixed with a fine powder of at least one of nickel, cobalt, graphite, copper, etc. as conductive assistants, and the resulting mixture may be bound to a nickel mesh with a polymer binder. In this case, usable examples of the above-mentioned polymer include polyvinyl alcohol, polytetrafluoroethylene, styrene-butadiene rubber, and silicone rubber. Such a polymer-bound alloy electrode has a low capacity, of 1.1 to 1.2 Ah/cm$^3$, but is not liable to falling-off of the alloy to be long in the life span thereof.

The kind of the hydrogen-absorbing alloy is not particularly limited, usable examples of which include LaNi$_5$, MmNi$_5$ (wherein Mm is misch metal), TiNi, ZrNi, VNi and like alloys, which are used in conventional hydrogen cells. Additionally stated, these hydrogen-absorbing alloys may be used either alone or in combination of at least 2 kinds thereof.

Since the hydrogen-absorbing alloy electrodes are involved in a rate-determining step in the cell according to the present invention, it is especially important from the standpoint of the life span thereof to prevent oxidation thereof during the course of over discharge. For that purpose, it is effective to form a layer comprising at least one of metallic nickel, cobalt and copper on the surface of the alloy. As such a layer formation method, use may be made of at least one of i) a method wherein at least one of elements easy of oxidation and dissolution in an alkaline solution at a hydrogen potential, examples of which include Mn, Al, Si and V, is incorporated into the alloy, and such an element(s) is treated with a 5- to 8-mol concentrated alkaline solution of KOH or the like at a high temperature (e.g. 80° to 120° C.) to be dissolved therein to thereby form a metallic nickel layer on the surface of the alloy; ii) a method wherein a cobalt powder is admixed with a powder of the alloy to form an electrode, from which cobalt is dissolved during the course of discharging and then precipitated in a metallic form on the surfaces of the alloy and the electrode during the course of charging; and iii) a method wherein 5 to 30 wt. %, preferably 10 to 20 wt. %, of at least one of nickel, copper and cobalt is plated on the surface of a powder of the alloy or the surface of an electrode according to chemical plating or electroplating. Particularly, the method iii), though high in cost, is most effective.

Electrodes wherein nickel hydroxide is used as the active material thereof are used as the chargeable auxiliary electrodes 4. Such electrodes can be obtained, for example, according to a chemical impregnation method. For example, a porous sintered nickel substrate is impregnated with a solution of nickel nitrate, then dried, and further immersed in an alkaline solution to convert nickel nitrate into nickel hydroxide. The foregoing procedure is repeated a plurality of times (e.g., 5 or 6 times), whereby a nickel electrode filled with the active material can be obtained. In this case, a solution of nickel sulfate or the like can be used in place of the solution of nickel nitrate. As for the amount of impregnation, it will suffice to usually provide such a nickel hydroxide content as to make the resulting electrode have a capacity of about 0.35 to 0.50 Ah/cm$^3$, preferably 0.40 to 0.45 Ah/cm$^3$.

An electrode wherein sintered nickel is used as the above-mentioned porous substrate (hereinafter referred to as a "sintered-type nickel electrode") is excellent in properties associated with the life span thereof. Further, a porous substrate, which may be either a foamed nickel substrate or a fibrous nickel substrate having a porosity of 94 to 97%, may be filled with a paste prepared using a high-density powder (tapping density: 1.9 to 2.1 g/cm$^2$) of nickel hydroxide and a solution of CMC or PVA, followed by pressing thereof to obtain a usable electrode.

Nickel hydroxide preferably contains 1 to 5 wt. % of Co and 2 to 10 wt. % of Zn as components in the crystals thereof in order to suppress generation of oxygen during charging of the resulting cell to thereby improve the charging efficiency thereof. Further, those admixed with 3 to 10 wt. % of cobalt monooxide CoO or an at most 300-mesh fine powder of metallic cobalt as a conductive assistant are especially high in utilization and excellent in charging efficiency at high temperatures. As for such nickel electrodes, one produced using a foamed nickel substrate will hereinafter referred to as a "foamed-type nickel electrode," while one produced using fibrous nickel will hereinafter referred to as a "fiber-type nickel electrode." They can secure a high capacity (0.55 to 0.65 Ah/cm$^3$), but are a little poor in durability.

As for the electrolytic solution 5, use can be made of an alkaline electrolytic solution in the form of an aqueous solution of potassium hydroxide, sodium hydroxide, lithium hydroxide, or the like as is used in known alkaline cells and the like. Such alkaline compounds may be used either alone or in combination of at least 2 kinds thereof. Further, the concentration of the electrolytic solution may usually be in the range of about 6 to about 8 mol, but may also be on the outside of the above-mentioned range though it depends on use application and the like. In order to improve the durability of the nickel hydroxide electrode, it is especially preferred that the concentration of the electrolytic solution involve about 1 mol of lithium hydroxide.

Besides these electrodes, the separators 3 are disposed between these electrodes in the cell of the present invention. Separators for use in a nickel-hydrogen cell can be used as separators 3a disposed between the air electrodes and the alloy electrodes from the viewpoint of mechanical strength, solution retention and alkali resistance. Such separators will suffice in so far as they can prevent a short circuit and have a low resistance. Although a polyamide nonwoven cloth is generally used, self-discharge is increased when it is hydrolyzed in a high-temperature alkaline solution to form nitrate ions. In view of this, when use is made of a hydrophilic-treated polypropylene nonwoven cloth, the resulting cell can accomplish an improvement in the life span thereof and suppression of the self-discharge thereof.

On the other hand, when use is made of an organic ion exchange membrane containing at least one kind selected from among a carboxyl group and amino groups or an inorganic ion exchange membrane containing at least one of aluminum oxide, titanium oxide, zirconium oxide, etc., such a membrane, though high in cost, is preferable because it can suppress permeation therethrough of oxygen. Separators 3b disposed between the alloy electrodes and the chargeable auxiliary electrodes may be substantially the same as the foregoing separators 3a. When oxygen gas generated in the chargeable auxiliary electrodes migrates to the alloy electrodes to react with a hydride, however, a decrease in charging efficiency is brought about. On the other hand, when hydrogen gas not charged in the alloy electrodes migrates to the chargeable auxiliary electrode, the hydrogen gas is mixed with oxygen gas to incur a danger. In view of the foregoing, use of a micro-porous film made of polypropylene, polyethylene or the like as is commonly used in a lithium cell is further preferable because it can more effectively suppress migration of either oxygen gas or hydrogen gas. Since such a film (thickness: 10 to 50 μm, porosity: 30 to 70%, pore size: 0.05 to 0.2 μm) is poor in mechanical strength, it may be composited with a hydrophilic-treated polypropylene nonwoven cloth to form a superior film.

Although the arrangement of the electrodes is not particularly limited in so far as it is suitably capable of charge and discharge, it is desired that both of the chargeable auxiliary electrode(s) and the gaseous diffusion electrode(s) be in the proximity of the hydrogen-absorbing alloy electrode(s). Further, it is especially preferred that a pair of chargeable auxiliary electrodes be provided between the gaseous diffusion electrodes on both sidewalls of the battery container while providing the hydrogen-absorbing alloy electrode(s) between the chargeable auxiliary electrodes, or that a pair of hydrogen-absorbing alloy electrodes be provided between the gaseous diffusion electrodes on both sidewalls of the battery container 6 while providing the chargeable auxiliary electrode(s) between the hydrogen-absorbing alloy electrodes.

Charging and discharging can be carried out using the cell of the present invention according to the following method.

Charging is carried out using the chargeable auxiliary electrodes 2 as the positive electrodes and the hydrogen-absorbing alloy electrodes 4 as the negative electrodes. In general, when charging is carried out using the gaseous diffusion electrodes 1 as the positive electrodes, carbon as the constituent material thereof may be oxidized, the water repellency thereof may be lost to deteriorate the performance of the electrodes, or leakage of the solution may occur. By contrast, in charging the cell according to the foregoing method, the above-mentioned problems do not arise because charging is carried out without using the gaseous diffusion electrodes as the positive electrodes.

In the present invention, nickel hydroxide is used as the active material of the chargeable auxiliary electrode(s). Since nickel hydroxide has a high catalytic activity and a large reactive area while the chargeable auxiliary electrode(s) is charged in the initial stage of charging after discharging unlike in the case of using a conventional nickel screen or the like, charging is possible at a lower charging voltage to decrease the loss of energy.

Discharging is carried out using the chargeable auxiliary electrodes 2 and/or the gaseous diffusion electrodes 1 as the positive electrodes and the hydrogen-absorbing alloy electrodes as the negative electrodes.

In this case, high output discharge is possible at a high discharge voltage when discharging is carried out using the chargeable auxiliary electrodes 2 as the positive electrodes and the hydrogen-absorbing alloy electrodes as the negative electrodes. On the other hand, when discharging is carried out using the gaseous diffusion electrodes 1 as the positive electrodes and the hydrogen-absorbing alloy electrodes 4 as the negative electrodes, slow discharge is possible like in the case of a conventional cell provided with a gaseous diffusion electrode. Additionally stated, when interchange between the chargeable auxiliary electrodes as the positive electrodes and the gaseous diffusion electrodes is made through an operation of a switch or the like, a single cell can be controlled in such a way as to be interchanged between slow discharge and high output discharge depending on the conditions of use thereof to increase the practical value thereof.

Further, when oxygen is recovered during the course of charging the cell and discharging is carried out while feeding the recovered oxygen to the gaseous diffusion electrodes 1 during the course of discharging, a higher voltage than in the case of using air can be secured to improve the energy efficiency of the cell. Additionally stated, the recovered oxygen can be stored using a high-pressure tank, a cobalt-Schiff base complex ([Co (salen)] or tie like), a porphyrin complex, a metal oxide ($Ag_2Mn_2O_5$ or the like), or the like.

Since the initial voltage of a single cell is as low as about 0.9 V, a plurality of single cells must be built up in the form of layers in series in a practical aspect to secure a high voltage. When the resulting assembled battery is discharged, the electrode capacity varies from single cell to single cell, resulting in damage to a single cell having a small capacity due to over discharge thereof. In view of this, control of charging and discharge voltages for each single cell is preferred in order to prolong the life span thereof. The over discharge of the alloy electrode may be in the range of at most 300 mV, preferably at most 150 mV, based on the hydrogen electrode.

The cell of the present invention can provide the following effects.

A nickel electrode(s) wherein nickel hydroxide is used as the active material thereof is used as the chargeable auxiliary electrode(s) 2 in the cell of the present invention. Thus, unlike the conventional nickel screen or expanded metal electrodes, the nickel electrode(s) according to the present invention has a high catalytic activity and a large reactive area, and is charged in the initial stage of charging to enable the charging voltage to be lowered, whereby the loss of energy can be decreased.

Further, in discharging the above-mentioned cell, electrodes to be used can be chosen through an operation of a switch or the like, whereby slow discharge can, of course, be effected like the conventional cells provided with a gaseous diffusion electrode, and high output discharge can also be suitably effected at a high voltage.

As described hereinbefore, according to the present invention, an improvement can be attained over the conventional air-hydride (hydrogen-absorbing alloy) cell involving such a disadvantage that no more than low output can be secured at a low voltage despite a high capacity thereof. In this connection, for example, a conventional cell provided with a gaseous diffusion electrode, when used as a mobile power source or the like, requires another high output power source. By contrast, when the cell of the present invention is used as a mobile power source or the like, a large capacity, a high voltage and a high output can be secured by only one cell without requiring any other high-output power source. Thus, the cell of the present invention is very useful.

A sintered-type nickel electrode, when used as the chargeable auxiliary electrode, is excellent in life span. On the other hand, a foamed-type nickel electrode as well as a fiber-type nickel electrode, when used as the chargeable auxiliary electrode, is excellent in an aspect of high capacity. Meanwhile, when a layer containing at least one of metallic nickel, cobalt and copper is formed on the surface of the hydrogen-absorbing alloy, it is effective in preventing oxidation of the alloy at the time of over discharge. The electrodes are isolated from one another with the separators in order to prevent a short circuit. Particularly, however, a separator(s) comprising a micro-porous film as a constituent thereof is preferably disposed particularly between the chargeable auxiliary electrodes(s) and the alloy electrode(s) to thereby prevent migration of oxygen generated from the chargeable auxiliary electrode(s). Additionally stated, a plurality of single cells must be built up in the form of layers in series when used as a mobile cell in an electric car or the like in order to secure a high voltage. The charging and discharge voltages of the single cells are preferably controlled independently of each other to prevent over discharge thereof from the standpoint of life span.

The following Example and Comparative Example will more clearly illustrate the features of the present invention.

Example 1:

A cell A was first produced, which has a structure as shown in FIG. 1.

Electrodes (100 mm×150 mm×0.6 mm) provided with a reactive layer composed of known activated carbon, 1 mg/cm$^2$ of platinum and palladium (1:1) admixed therewith and a fluororesin as a water-repellant, and a solution leakage-preventive layer composed of a carbon fiber and a fluororesin admixed therewith as a water-repellant were used as air electrodes, which were gaseous diffusion electrodes 1, to each of which a lead plate was then attached by spot welding.

Sintered-type nickel electrodes will be illustrated as an example of the chargeable auxiliary electrodes 2. A sintered-type substrate having a porosity of 82% was impregnated with a saturated solution of nickel nitrate, dried, and immersed in an aqueous solution of sodium hydroxide at 70° to 100° C. The step of converting the nitrate into nickel hydroxide was repeated 5 or 6 times to produce an electrode (100 mm×150 mm×0.8 mm), which was used as a chargeable auxiliary electrode 2, to which a lead plate was then attached by spot welding. The discharging capacity of this nickel electrode was 6 Ah at 0.2° C.

This sintered-type nickel electrode, though low in capacity (0.40 to 0.50 Ah/cm$^3$), has a long life span. By contrast, when use is made of either a foamed-type nickel electrode or a fiber-type nickel electrode produced by filling a foamed nickel substrate or a fibrous nickel substrate with a paste prepared by mixing a high-density nickel hydroxide powder (tapping density: 2.03 g/cm$^2$) with 5 wt. % of a fine metallic cobalt powder (400 mesh) and mixing the resulting mixture with a 1 wt. % solution of PVA, and pressing the resulting filled nickel substrate, a 30 to 60% higher capacity (0.55 to 0.65 Ah/cm$^3$) can be secured to enable the nickel electrode to be contained in a more compact state in a cell. However, the latter types of the nickel electrodes are weak in binding power and hence poor in durability. These nickel electrodes decrease in durability in the following order: sintere-type> fiber-type> foamed-type, but increase in capacity in the foregoing order. Thus, it will suffice to appropriately choose one type of these nickel electrodes depending on the use application of the cell. In this Example, any one type of these nickel electrodes may be used because this Example is aimed at demonstrating only the working performance of the cell.

The hydrogen-absorbing alloy electrodes 4 were produced according to the following procedure. First, $MmNi_{3.7}MN_{0.4}A_{0.3}CO_{0.6}$, which is one of $LaNi_5$ type alloys, was pulverized, passed through a 200-mesh screen, then mixed with 5 wt. % of a cobalt powder, and admixed with 1.5 wt. % of carboxymethylcellulose to prepare a paste. Subsequently, a foamed nickel plate having a porosity of 95% and a thickness of 2.8 mm was filled with the CMC paste, pressed, immersed in a 6M KOH solution at a temperature of 100° to 110° C. for 1 hour, subjected to an etching treatment, then dried under reduced pressure, then coated with a 3 wt. % dispersion of a fluororesin, and dried. Subsequently, a lead plate was attached to the resulting product by spot welding. The resulting electrode (100 mm×150 mm×1.8 mm) had a dischargeable capacity of 38 Ah. With a single cell as a unit, a pair of nickel electrodes had a capacity of 12 Ah, and a pair of hydrogen-absorbing alloy electrodes had a 0.2C rate discharge of 76 Ah.

A fibrous nickel substrate may be used in place of the foamed nickel substrate. The foamed-type as well as fiber-type alloy electrode has a high capacity of 1,300 to 1,400 $mAh/cm^3$ to enable the resulting cell to be made compact, but is liable to falling-off of the alloy and hence poor in durability. On the other hand, a polymer-type alloy electrode, produced by adding 3 wt. % of a fluororesin (PTFE) to a plated alloy powder prepared by plating an alloy powder with 10 wt. % of nickel or copper, forming the resulting mixture into a sheet, and hot-pressing the sheet on a nickel mesh, has a little low capacity of about 1,100 to 1,200 $mAh/cm^3$, but has the alloy strongly bound and has the surface of the alloy protected with a plating film to prolong the life span thereof. In this Example, any one type of the foamed-type, fiber-type and polymer-type alloy electrodes may be used because this Example is aimed at demonstrating only the working properties of the cell.

The alloy electrodes on both sides were each used in a state of being wrapped with a bag of a 0.18 mm-thick hydrophilic-treated polypropylene nonwoven cloth, while the chargeable auxiliary electrodes on both sides were used in a state of being wrapped with a bag of a 0.03 mm-thick micro-porous polypropylene film (porosity: 45%, pore size: 0.1 μm). In other words, the hydrophilic-treated polypropylene nonwoven cloth was used in separators (3a) disposed between the air electrodes and the alloy electrodes, while a composite of the hydrophilic-treated polypropylene nonwoven cloth and the micro-porous polypropylene film was used in separators (3b) disposed between the alloy electrodes and the chargeable auxiliary electrodes.

A glass fiber-reinforced epoxy resin jar was used as the battery container 6, to the inner periphery of which the above-mentioned air electrodes were adhered and fixed with an epoxy resin. An aqueous solution of potassium hydroxide having a specific gravity of 1.25 was admixed with 25 g/liter of lithium hydroxide to prepare a mixture, which was used as an electrolytic solution.

Charging and discharging were carried out using the cell A thus produced. Additionally stated, for comparison, charging and discharging were also carried out using a cell B having substantially the same structure as the cell A except that 30-mesh nickel screens having a thickness of 0.5 mm were used as the chargeable auxiliary electrodes.

First, the cell A was charged at an ambient temperature of 20° C., and discharging thereof was carried out first between the chargeable auxiliary electrodes 2 and the hydrogen-absorbing alloy electrodes 4 at an electric current of 30 A by a flick of a switch (not shown in the FIGURE). In such discharging, the average voltage was 1.0 V, the average output was 31.5 W, and the capacity was 10 Ah.

A circuit was automatically closed at a final discharge voltage of 0.85 V. Subsequently, discharging was carried out between the air electrodes and the hydrogen-absorbing alloy electrodes at the same electric current as mentioned above till 0.5 V in voltage. In such discharging, the average voltage was 0.67 V, the average output was 20 W, and the capacity was 63 Ah.

By contrast, when the cell B was charged in the same manner as the cell A and discharging was then carried out between the air electrodes and the hydrogen-absorbing alloy electrodes at the same temperature as mentioned above at an electric current of 30 A, the average voltage was 0.7 V and the average output was 21 W.

Thus, the cell B is low in output in terms of average voltage. By contrast, it is understandable that the cell A is satisfactorily capable of not only low output discharge but also high output discharge at a high voltage by an automatic flick of the switch despite the same capacity as the cell B.

Figure 2:
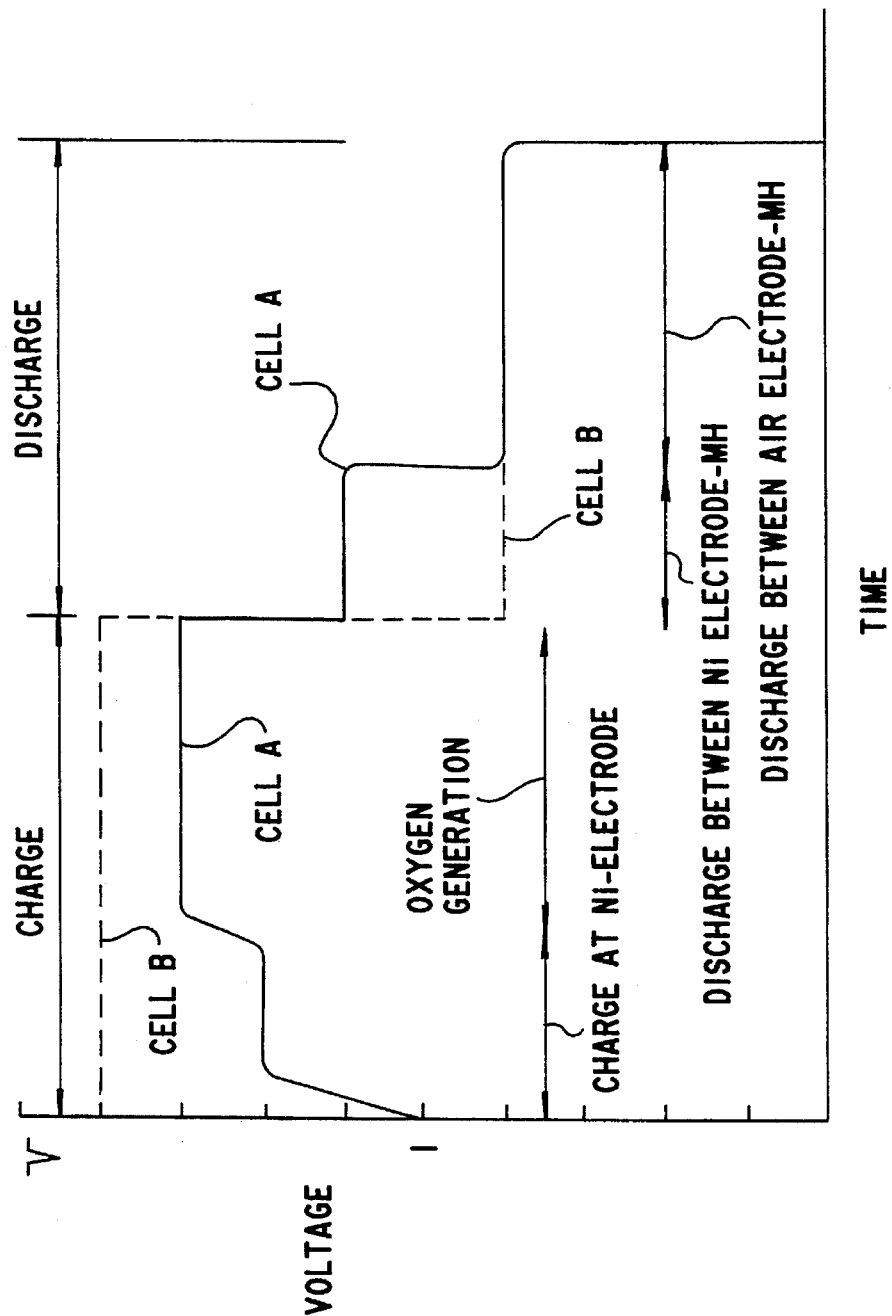
FIG. 2 is a diagram showing respective charge-discharge curves of cells A and B in Example 1.

Further, in the cell B, the charging voltage was maintained at an oxygen-generating potential throughout 5 hours of charging at 15 A to be substantially constant around 1.8 V. By contrast, in the cell A, the average voltage during about 1 hour of charging (for 12 Ah) from the start thereof was 1.45 V because no oxygen was generated by charging of the nickel electrodes. Thereafter, the voltage increased to 1.6 V because of the occurrence of an oxygen-generating reaction. The nickel hydroxide electrodes are lower in oxygen-generating voltage than the nickel screen. As for subsequent discharging at 15 A (0.2C rate or 5 hour rate) after the charging, about 72 Ah of discharge was effected at a discharge voltage of 0.85 V in the case of the cell B, whereas discharge was effected at 1.25 V for 12 Ah from the start thereof and at 0.85 V for 60 Ah as the rest of discharge. These charge-discharge curves are shown in FIG. 2, from which the energy efficiencies $\epsilon_A$ and $\epsilon_B$ of the cells A and B can be calculated according to the following formulae:

$$\epsilon_A = (1.25V \times 12Ah + 0.85V \times 60AH)/$$
$$(1.45V \times 12Ah + 1.6V \times 63Ah)$$
$$= 56\%.$$
$$\epsilon_B = (0.85V \times 72Ah)/1.8V \times 75Ah) = 45\%$$

Accordingly, it is understandable that the cell A could be improved by 56–45=11% in energy efficiency over the cell B. As described hereinbefore, a lower charging voltage and a high discharge voltage can both be secured in the cell A, which is therefore understandably improved greatly in energy efficiency. Furthermore, when oxygen recovered during the course of charging is used, in place of air, in the air electrodes, the discharge voltage can be further increased to attain an improvement of 2 to 3% in energy efficiency.

What is claimed is:

1. A cell provided with a gaseous diffusion electrode: comprising a gaseous diffusion electrode, a hydrogen-absorbing alloy electrode, and a chargeable auxiliary electrode wherein nickel hydroxide is used as the active material thereof.

2. A cell provided with a gaseous diffusion electrode as claimed in claim 1, wherein said chargeable auxiliary electrode is a sintered-type nickel electrode.

3. A cell provided with a gaseous diffusion electrode as claimed in claim 1, wherein said chargeable auxiliary electrode is a foamed or fibrous substrate filled with nickel hydroxide.

4. A cell provided with a gaseous diffusion electrode as claimed in any one of claims 1 to 3, wherein said hydrogen-absorbing alloy electrode is made of a hydrogen-absorbing alloy having a layer of at least one of metallic nickel, cobalt and copper formed on the surface thereof.

5. A cell provided with a gaseous diffusion electrode as claimed in claim 1, wherein gaseous diffusion electrodes of the kind as described above are disposed on both sidewalls of a battery container, wherein a pair of chargeable auxiliary electrodes of the kind as described above are disposed between said gaseous diffusion electrodes, and wherein said hydrogen-absorbing alloy electrode is disposed between said chargeable auxiliary electrodes.

6. A cell provided with a gaseous diffusion electrode as claimed in claim 1, wherein gaseous diffusion electrodes of the kind as described above are disposed on both sidewalls of a battery container, wherein a pair of hydrogen-absorbing alloy electrodes of the kind as described above are disposed between said gaseous diffusion electrodes, and wherein said chargeable auxiliary electrode is disposed between said hydrogen-absorbing alloy electrodes.

7. A cell provided with a gaseous diffusion a electrode as claimed in any one of claims 1, 2, 5, or 6 wherein a separator comprising a micro-porous film as a constituent thereof is disposed between said hydrogen-absorbing alloy electrode and said chargeable auxiliary electrode.

8. A method of charging a cell, said cell being provided with a gaseous diffusion electrode: comprising a gaseous diffusion electrode, a hydrogen-absorbing alloy electrode, and a chargeable auxiliary electrode wherein nickel hydroxide is used as the active material thereof, wherein charging is carried out using said chargeable auxiliary electrode as the positive electrode thereof and said hydrogen-absorbing alloy electrode as the negative electrode thereof.

9. A method of discharging a cell, said cell being provided with a gaseous diffusion electrode: comprising a gaseous diffusion electrode, a hydrogen-absorbing alloy electrode, and a chargeable auxiliary electrode wherein nickel hydroxide is used as the active material thereof, wherein discharging is carried out using said chargeable auxiliary electrode and/or said gaseous diffusion electrode as the positive electrode thereof and said hydrogen-absorbing alloy electrode as the negative electrode thereof.

10. A method of charging and discharging a cell, said cell being provided with a gaseous diffusion electrode: comprising a gaseous diffusion electrode, a hydrogen-absorbing alloy electrode, and a chargeable auxiliary electrode wherein nickel hydroxide is used as the active material thereof, wherein oxygen generated during the course of charging said cell is recovered, and said oxygen is fed to said gaseous diffusion electrode during the course of discharging.

11. A method of charging and discharging battery cells, said cells being provided with a gaseous diffusion electrode: comprising a gaseous diffusion electrode, a hydrogen-absorbing alloy electrode, and a chargeable auxiliary electrode wherein nickel hydroxide is used as the active material thereof, and built up in the form of layers in series during use thereof, wherein charge-discharge control is effected for each of single cells.

12. A method of discharging a battery cell, said cell being provided with a gaseous diffusion electrode: comprising a gaseous diffusion electrode, a hydrogen-absorbing alloy electrode, and a chargeable auxiliary electrode wherein nickel hydroxide is used as the active material thereof, wherein discharging is carried out using said hydrogen-absorbing alloy electrode as the negative electrode thereof and said chargeable auxiliary electrode and said gaseous diffusion electrode as the positive electrode thereof which are used either simultaneously or one by one for said discharging by a flick of a switch.

13. A cell provided with a gaseous diffusion electrode as claimed in claim 4, wherein a separator comprising a micro-porous film as a constituent thereof is disposed between said hydrogen-absorbing alloy electrode and said chargeable auxiliary electrode.

* * * * *